United States Patent
Glück et al.

(10) Patent No.: US 6,342,540 B1
(45) Date of Patent: Jan. 29, 2002

(54) METHOD FOR PRODUCING WATER EXPANDABLE STYRENE POLYMERS

(75) Inventors: Guiscard Glück, Mainz; Klaus Hahn, Kirchheim; Peter Dodel, Rhodt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,484

(22) PCT Filed: Mar. 19, 1999

(86) PCT No.: PCT/EP99/01841

§ 371 Date: Sep. 15, 2000

§ 102(e) Date: Sep. 15, 2000

(87) PCT Pub. No.: WO99/48955

PCT Pub. Date: Sep. 30, 1999

(30) Foreign Application Priority Data

Mar. 25, 1998 (DE) .......................................... 198 13 108

(51) Int. Cl.⁷ ................................ C08J 9/20; C08J 9/18

(52) U.S. Cl. ............................................ 521/56; 521/60
(58) Field of Search ...................................... 521/56, 60

(56) References Cited

FOREIGN PATENT DOCUMENTS

EP 0305862 A * 3/1989

OTHER PUBLICATIONS

Japanese Abstract–vol. 96, No. 6, Jun. 28, 1996 & JP 08 041236A (Sekisui Plastics Co.) Feb. 13, 1996 (Published).*
"Water Expandable Polystyrene" By J.J. Crevecour, Dissertation Made in 1997 at the Eindoven University.*

* cited by examiner

*Primary Examiner*—Morton Foelak
(74) *Attorney, Agent, or Firm*—Oblon, Spivak, McClelland, Maier & Neustadt, P.C.

(57) ABSTRACT

A process prepares styrene polymers comprising water as sole blowing agent by mixing a polystyrene melt with water and with an emulsifying agent in an extruder, extruding the melt into a waterbath and pelletizing the cooled extrudate.

5 Claims, No Drawings

METHOD FOR PRODUCING WATER EXPANDABLE STYRENE POLYMERS

The invention relates to a process for preparing water-expandable styrene polymers (WEPS) by extruding polystyrene with addition of water.

An example of a process for preparing expandable polystyrene (EPS) beads is the extrusion of polystyrene with addition of a volatile organic blowing agent. The usual blowing agents are hydrocarbons, in particular pentane. In order to protect the environment, pentane emitted during the production and processing of EPS has to be reclaimed. This is complicated and costly. In the longer term, therefore, it would be useful to replace these organic substances with blowing agents which are less hazardous, for example water.

The Eindhoven University 1997 dissertation by J. J. Crevecoeur "Water Expandable Polystyrene" describes a process for preparing WEPS by firstly preparing a fine emulsion of water in styrene with the aid of surface-active substances, polymerizing the styrene to a conversion of 50%, suspending the mixture in water with phase inversion, and finally polymerizing the styrene to completion with the aid of peroxide initiators. The surface-active substances used comprise amphiphilic emulsifiers, e.g. sodium [bis(2-ethylhexyl) sulfosuccinate] or sodium styrenesulfonate, or block copolymers made of polystyrene blocks and of polystyrenesulfonate blocks. All of these substances have both a hydrophilic and a hydrophobic radical and are therefore able to emulsify water in styrene.

A disadvantage of this process is that it is carried out in two stages: water is first emulsified in the styrene/polystyrene mixture and then the organic phase is suspended in water, with phase inversion.

It is an object of the present invention, therefore, to develop a simpler, single-stage process for preparing WEPS.

We have found that this object is achieved by mixing a melt of a styrene polymer with from 3 to 20% by weight of water and with an emulsifying agent under superatmospheric pressure, extruding the melt into a cooling medium maintained under superatmospheric pressure and pelletizing this extrudate after cooling.

Preferred styrene polymer is polystyrene, but use may also be made of copolymers of styrene with up to 20% by weight of comonomers, e.g. alkylstyrenes, divinylbenzene, acrylonitrile, 1,1-diphenylethene or α-methylstyrene, or else of mixtures of styrene polymers with up to 20% by weight of other polymers, such as rubbers or polyphenylene ethers.

An appropriate method for carrying out the novel process is to use an extruder and to operate at from 180 to 230° C., preferably from 190 to 220° C. An appropriate method for injecting the water here is via a metering pump, and the amount of water is preferably from 5 to 15% by weight and in particular from 8 to 13% by weight, based on the styrene polymer. The amount used of the emulsifying agent is preferably from 0.1 to 12% by weight and in particular from 0.5 to 8% by weight. Preferred emulsifying agents are amphiphilic organic compounds which contain hydrophilic groups, such as hydroxyl, carboxyl or amine radicals, and also contain hydrophobic groups, such as alkyl or aryl. They bring about homogeneous distribution of the water in very fine droplets within the melt, and this action is supported by the shear in the extruder. They also have the action of preventing the water within the finished EPS beads from exuding, ensuring that it remains within the beads when stored.

The emulsifying agent may be used directly as such. Examples of suitable substances are salts of long-chain organic acids, e.g. the sodium salt of di-2-ethylhexyl sulfosuccinate, sodium [bis(2-ethylhexyl) sulfosuccinate], block copolymers made of polystyrene blocks and of polystyrenesulfonate blocks, or else quaternary ammonium alkylsulfonates, oxalkylated ammonium salts, or else hydroxyl-containing esters of fatty acids or of fatty alcohols.

The emulsifying agent may also be introduced via recycled polystyrene bead foams (recycled EPS materials) which comprise from 0.2 to 2% by weight of the usual coating agents from EPS production, e.g. antistatics or anticoagulants and/or agents to reduce cooling time. These coating agents are mostly likewise amphiphilic organic compounds. In this case the styrene polymer may be composed to some extent or entirely of recycled EPS materials. The amounts of the recycled EPS materials admixed with the styrene polymer are preferably from 5 to 50% by weight.

It is also possible to introduce the emulsifying agent in the form of thermally labile organic compounds which are decomposed into amphiphilic organic compounds at extrusion temperatures. Examples of these are halogen compounds, such as hexabromocyclododecane, 1,1,2,2-tetrabromoethane and chloroparaffin; organic peroxides, such as dibenzoyl peroxide and dicumyl peroxide; and phosphorus compounds, such as aryl phosphates.

It is appropriate to add nucleating agents during the extrusion, for example talc or polyethylene waxes, and also to add organic bromine compounds, such as the flame retardant hexabromocyclododecane, preferably together with flame-retardant synergists. In this case the amounts added have to be somewhat higher than usual, e.g. from 0.5 to 5% by weight, since some decomposition of the bromine compounds occurs at the high temperatures of extrusion.

The temperature at which the melt is extruded from the die should be higher than the glass transition temperature of the styrene polymer, preferably from 120 to 180° C. So that the water present in the styrene polymer does not evaporate at these temperatures and cause premature foaming, cooling has to be rapid and take place under superatmospheric pressure. For this, the melt is injected into a cooling medium, preferably into a waterbath maintained at room temperature and at a pressure of from 2 to 20 bar, preferably from 5 to 15 bar, where the cooled melt extrudate is pelletized.

WEPS beads produced during the pelletization comprise from 2 to 20% by weight, in particular from 5 to 15% by weight, of water. Their bead size is from 0.2 to 5 mm, preferably from 0.5 to 2 mm. They may be foamed using superheated steam or air heated to between 110 and 140° C., to give foam beads. A particularly elegant foaming process which gives foam beads with a very low bulk density is described in the German Patent Application P 198 12 854.1.

The WEPS foam beads may be fused, like conventional EPS foam beads, to give foam sheets, foam slabs or foam moldings, which may be used as insulating or packaging materials.

The percentages given in the Example are based on weight.

Example

A premix made from 25 kg of polystyrene PS 158 K (BASF AG) and 12.5 g of HP 325 talc is melted in a twin-screw extruder (ZSK 30) at a melt temperature of not more than 220° C. In addition, 5% by weight of Lutensit A-BO (BASF AG) and 10% by weight of water are metered into the melt within the extruder. The melt emerging from the extruder die (die temperature 160° C.) is pelletized by a Gala (USA) underwater pelletizer. The pelletization is carried out at a pressure of 10 bar. This pressure is achieved using a stricture (tube of length 80 m) installed between pelletization and drier. The product is a bead-shaped pellet with an average diameter of about 1.5 mm. (Lutensit A-BO is the sodium salt of di-2-ethylhexyl sulfosuccinate).

The pellets are foamed with air at 130° C., whereupon the beads expand to one tenth of their initial bulk density of 600 g/l. The prefoamed beads are then freed from residual water in a stream of dry air at 70° C. Finally, the beads are further foamed in a conventional prefoamer for EPS, using steam. After three foaming procedures using steam, and between each of these a drying procedure to remove residual water, the foam beads obtained have a bulk density of 10 g/l.

We claim:

1. A process for preparing expandable styrene polymer beads comprising water as sole blow an b mixing a g melt of the styrene polymer with from 5 to 20% by weight of water and with an emulsifying agent which is an amphiphilic organic compound which contains both hydrophilic hydroxyl, carboxyl or amine groups and hydrophobic alkyl or aryl groups under superatmospheric pressure, extruding the melt into a cooling medium maintained at an elevated pressure and pelletizing the cooled extrudate.

2. The process as claimed in claim 1, wherein the amount of said emulsifying agent ranges from 0.1 to 12% by weight.

3. The process as claimed in claim 1, wherein the styrene polymer is mixed with water and with the emulsifying agent in an extruder at a temperature from 180 to 230° C.

4. The process as claimed in claim 1, wherein the melt is extruded into a water bath maintained at room temperature and at a pressure ranging from 2 to 20 bar.

5. A method of preparing foamed products, comprising:

foaming the expandable styrene polymer beads of claim 1, comprising from 2 to 15% by weight of water into said foamed product.

* * * * *